May 14, 1929.  G. DARRIEUS  1,712,491
RECTIFYING SYSTEM
Original Filed Aug. 29, 1921
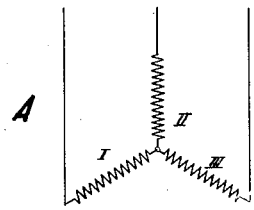
Fig.1.
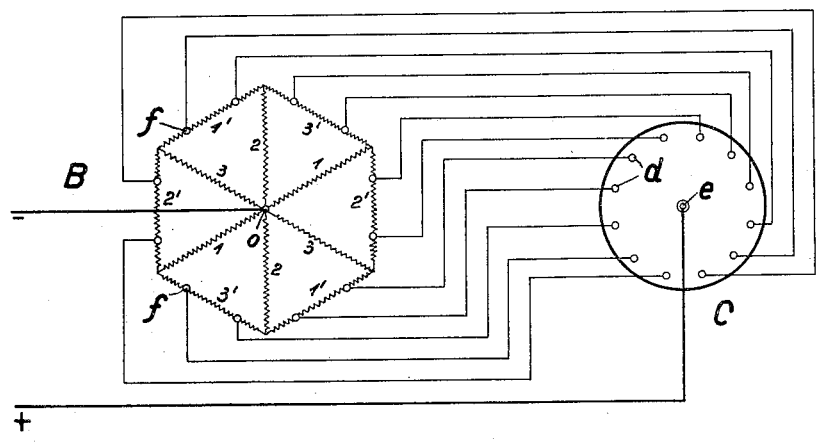
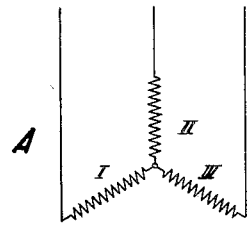
Fig.2.
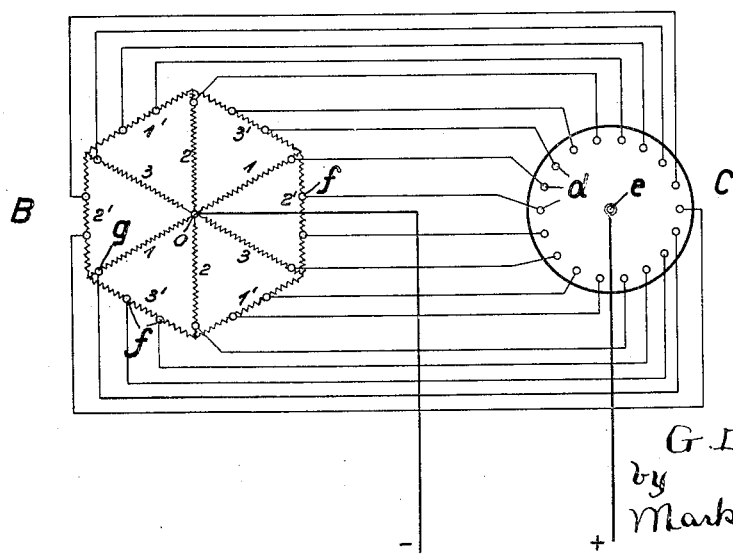
Inventor
G. Darrieus
by
Marker Clerk
Attys.

Patented May 14, 1929.

1,712,491

UNITED STATES PATENT OFFICE.

GEORGES DARRIEUS, OF PARIS, FRANCE, ASSIGNOR TO AKTIENGESELLSCHAFT BROWN, BOVERI & CIE., OF BADEN, SWITZERLAND.

RECTIFYING SYSTEM.

Application filed August 29, 1921, Serial No. 496,268, and in France November 27, 1919. Renewed December 1, 1928.

This invention relates to improvements in rectifying systems.

For feeding rectifiers having six anodes it has already been proposed to use a six-phase transformer containing on each of three iron legs, four secondary winding portions in addition to the primary winding.

By combining a star-connection and a hexagonal connection of these winding portions there is effected a better distribution of current over the three phases on the primary side.

For the purpose of feeding rectifiers having more than six anodes from a primary three-phase net, the present invention provides means whereby, with the same winding combination on the transformer, the feeding of a greater number of anodes with the same number of uniformly spaced phases is effected by tappings from the said winding portions.

Figure 1 illustrates the case of feeding twelve rectifier anodes, and

Figure 2 illustrates the case of feeding eighteen rectifier anodes from one three-phase net.

The windings are illustrated in the usual manner in the fashion of a vector diagram, with a representation in space of the time difference of phase, so that the secondary windings constitute a hexagon with its diagonals.

In both figures, A is the primary winding, B is the secondary winding of the transformer, and C is a rectifier fed from the latter comprising the anodes $d$ and the cathode $e$.

The three phases of the primary side of the transformer which may be regarded as basal phases, are indicated by the Roman numerals I, II and III, and on the same legs there are located the three secondary windings which consist each of four portions; these windings are indicated by Arabic numerals, 1, 1, 1', 1', 2, 2, 2', 2', 3, 3, 3', 3'.

The winding portions 1 1, 2 2, 3 3, are star-connected, whereas the winding portions 1', 1', 2', 2', 3', 3', form a regular hexagon. The negative rectifier main is connected at the zero or neutral point $o$.

In Figure 1, for the purpose of feeding twelve rectifier anodes, the twelve tappings $f$ on the secondary winding B of the transformer are distributed in such a manner that the voltages between the tapping points that are adjacent in the vector diagram are respectively equal to one another and are shifted through equal angles relatively to one another.

As shown in the diagram, these voltages form a regular duodecagon, the corners of which are located each on one of voltage vectors of the original hexagon windings 1', 1', 2', 2', 3', 3', and consequently on a circle described from the centre $o$. A balanced polyphase system greater in phase number than the primary system is thus obtained.

For feeding eighteen anodes, tappings $g$ are located, according to Figure 2, upon the star-connected winding portions 1, 1, 2, 2, 3, 3, while the tappings $f$ located on the hexagon winding 1', 1', 2', 2', 3', 3', must be brought nearer together in order that a regular eighteen-sided polygon shall be formed in the voltage vector diagram.

The increase in the number of phases produces an increase of the direct current voltage with constant maximum voltage between the anodes, a decrease in the fluctuations of the direct current and of the higher harmonics on the alternating current side, and also a decrease in the voltage drop, and therefore a better utilization of the transformer.

The employment of rectifiers having twelve or eighteen anodes is not required when one and the same transformer is employed to feed simultaneously two or three rectifiers of six anodes or two rectifiers of nine anodes.

Having now described my invention what I claim as new and desire to secure by Letters Patent is:—

1. In a rectifying system comprising a polyphase line having a small basal phase number and a polyphase rectifier having more than twice as many phases as said line, a transformer having a winding of said basal phase number connected to said line and a winding system providing connection to said rectifier, said rectifier winding system comprising a plurality of winding elements of the basal phases connected into a closed regular polygon and additional star-connected winding elements of said basal phases diagonally connecting the corners of said polygon, said rectifier being connected to a set of terminals on said secondary winding system greater in number than the sides of said polygon, said terminals constituting a balanced polyphase system corresponding in phase number to said rectifier.

2. In an alternating-current rectifying system, a transformer comprising a primary winding and a secondary winding having a larger number of phases than said primary winding, said secondary winding comprising a balanced star-connected winding system composed of winding elements of the primary phases, each end of said star-connected winding system having connected thereto an additional winding element of a different primary phase, a plurality of secondary transformer terminals greater in number than twice the number of primary phases so distributed on the elements of the secondary winding that the radii-vectors thereto from the neutral point of said star-connected winding system constitute a balanced polyphase system, and a polyphase rectified device having a plurality of terminals of like polarity connected to said secondary winding terminals, the neutral point of said star constituting one direct-current terminal.

3. In a rectifying system, a polyphase line, a polyphase rectifying device having a larger phase number than said line, and a transformer interconnecting said device and said line, said transformer comprising a primary winding having basal phase windings corresponding to the phases of said line and connected thereto, and a secondary winding comprising a plurality of winding elements of the primary phases connected into a closed polygon and additional similar winding elements diagonally connected in star to the corners of said polygon, said rectifying device having a plurality of electrodes of like polarity connected to a plurality of terminals on said secondary winding, said terminals being greater in number than twice the number of primary phases and constituting a balanced polyphase system.

4. In an alternating-current rectifying system, a transformer comprising a primary winding and a secondary winding having more than twice the number of phases of the primary winding, said secondary winding comprising a balanced star-connected winding system composed of winding elements of the primary phases, each phase end of said star-connected winding system having connected thereto a pair of additional winding elements belonging to primary phases displaced in phase against said star phase, a plurality of secondary transformer terminals distributed partially on the star-connected winding elements and partially on the additional winding elements and so arranged as to constitute terminals of a balanced polyphase system, and a polyphase rectifier device having a plurality of terminals of like polarity connected to said secondary transformer terminals, the neutral point of said star constituting one direct-current terminal of said rectifying system.

5. In a rectifying system comprising a polyphase line having a small basal phase number and a polyphase rectifier having more than twice as many phases as said line, a transformer having a winding of said basal phase number connected to said line and a winding system providing connection to said rectifier, said rectifier winding system comprising a plurality of winding elements of the basal phases connected into a closed regular polygon and additional star-connected winding elements of said basal phases diagonally connecting the corners of said polygon, said rectifier being connected to a set of terminals on said secondary winding system greater in number than the sides of said polygon, some of said terminals being disposed on the star winding elements and some of said terminals being disposed on the polygonal winding elements, said terminals constituting a balanced polyphase system corresponding in phase number to said rectifier.

6. In a rectifying system a polyphase line, a polyphase rectifying device having a larger phase number than said line, and a transformer interconnecting said device and said line, said transformer comprising a primary winding having basal phase windings corresponding to the phases of said line and connected thereto, and a secondary winding comprising a plurality of winding elements of the primary phases connected into a closed polygon and additional similar winding elements diagonally connected in star to the corners of said polygon, said rectifying device having a plurality of electrodes of like polarity connected to a plurality of terminals on said secondary winding, some of said terminals being disposed on the polygonal winding elements and some of said terminals being disposed on the star winding elements, said terminals being greater in number than twice the number of primary phases and constituting a balanced polyphase system.

7. In a rectifying system comprising a three-phase line and an eighteen-phase rectifier, a transformer having a three-phase winding connected to said line and an eighteen-phase winding providing connection to said rectifier, said last named winding comprising a plurality of winding elements of the primary phases connected into a closed regular polygon and additional star-connected winding elements of said primary phases joining the corners of said polygon, the phases of said rectifier being connected to a set of terminals on said secondary winding, said terminals being disposed in part on the winding elements constituting said polygon and in part on the winding elements constituting the star.

8. In an alternating-current rectifying system, a transformer comprising a primary winding and a secondary winding having a larger number of phases than said primary winding, said secondary winding comprising a balanced star-connected winding system composed of winding elements of the primary phases, each end of said star-connected winding system having connected thereto an additional winding element of a different primary phase, a plurality of secondary transformer terminals greater in number than twice the number of primary phases so distributed on the elements of the secondary winding that the radii-vectors thereto from the neutral point of said star-connected winding system constitute a balanced polyphase system, and a polyphase rectifier device having a plurality of terminals of like polarity connected to said secondary winding terminals, some of said winding terminals being disposed on the winding elements constituting the star, and some of said terminals being disposed on said additional winding elements.

9. In a rectifying system, a polyphase supply line, rectifier apparatus having anodes greater in number than the number of phases of said line, and transformer means providing an operative connection between said line and said apparatus and comprising primary winding means connected to said line and providing phases of number equal to the number of phases of said line and secondary winding means having a neutral point and providing rectifier supply phases, a winding element forming part of said secondary winding means and being connected to said neutral point and being common with respect to adjacent rectifier supply phases, other winding elements each forming part of said secondary winding means and each being connected to said first-mentioned winding element and cooperating therewith to provide said adjacent rectifier supply phases and being connected to certain of said anodes, each of said winding elements being associated with a primary phase different than that with which the others are associated.

10. In a rectifying system, a polyphase supply line, rectifier apparatus having anodes, and transformer means excited from said line and providing supply phases for said anodes; said transformer means including a winding element common with respect to certain of said supply phases, and other winding elements connected to one and the same end of said first-mentioned winding element and cooperating therewith to provide said certain supply phases.

11. In a rectifying system, a polyphase supply line, rectifier apparatus having anodes, transformer means excited from said line and including polyphase primary winding means and secondary winding means providing supply phases for said anodes, a winding element forming part of said secondary winding means and being common with respect to certain of said supply phases, and other winding elements forming part of said secondary winding means and being connected to one and the same end of said first-mentioned winding element and cooperating therewith to provide said certain supply phases, each of said winding elements being associated with a primary phase different than the primary phases with which the others are associated.

In testimony whereof I have signed my name to this specification.

GEORGES DARRIEUS.